United States Patent
Bando

(10) Patent No.: US 10,351,650 B2
(45) Date of Patent: Jul. 16, 2019

(54) METHOD FOR PRODUCING CONJUGATED DIENE POLYMER

(71) Applicant: ZEON CORPORATION, Tokyo (JP)

(72) Inventor: Fumiaki Bando, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/248,227

(22) Filed: Jan. 15, 2019

(65) Prior Publication Data

US 2019/0144587 A1 May 16, 2019

Related U.S. Application Data

(63) Continuation of application No. 15/522,483, filed as application No. PCT/JP2015/080339 on Oct. 28, 2015.

(30) Foreign Application Priority Data

Oct. 29, 2014 (JP) .................................. 2014-220487

(51) Int. Cl.
| | |
|---|---|
| *C08F 236/06* | (2006.01) |
| *C08F 236/08* | (2006.01) |
| *C08F 236/10* | (2006.01) |
| *C08F 236/14* | (2006.01) |
| *C08F 4/44* | (2006.01) |
| *C08F 236/12* | (2006.01) |
| *C08F 36/04* | (2006.01) |
| *C08F 4/40* | (2006.01) |
| *C08F 236/04* | (2006.01) |

(52) U.S. Cl.
CPC .............. *C08F 236/12* (2013.01); *C08F 4/40* (2013.01); *C08F 4/44* (2013.01); *C08F 36/04* (2013.01); *C08F 236/04* (2013.01); *C08F 236/06* (2013.01); *C08F 236/08* (2013.01); *C08F 236/10* (2013.01); *C08F 2438/00* (2013.01); *C08F 2438/01* (2013.01)

(58) Field of Classification Search
CPC ...... C08F 4/44; C08F 236/06; C08F 236/236; C08F 236/08; C08F 236/10; C08F 236/14
See application file for complete search history.

(56) References Cited

U.S. PATENT DOCUMENTS

| 2014/0350201 A1 | 11/2014 | Bando et al. |
| 2016/0200903 A1 | 7/2016 | Okamatsu et al. |
| 2016/0369027 A1 | 12/2016 | Asandei |

FOREIGN PATENT DOCUMENTS

| JP | 2015-513737 A | 5/2015 |
| WO | 96/030421 A1 | 10/1996 |
| WO | 2013/038957 A1 | 3/2013 |
| WO | 2014/175199 A1 | 10/2014 |
| WO | 2015/003137 A1 | 1/2015 |
| WO | 2015/029909 A1 | 3/2015 |

OTHER PUBLICATIONS

International Search Report dated Jan. 19, 2016, issued in counterpart International Application No. PCT/JP2015/080339.
Extended European Search Report dated May 30, 2018, issued in Application No. 15854766.1 (PCT/JP2015/080339).
Seoung UK Heo et al., "Atom Transfer Radical Polymerization of 1, 3-Butadiene Using Novel CuBr/Pyridine-2-Carboxamide Catalysts", Journal of Industrial and Engineering Chemistry, vol. 12, No. 2, 2006, pp. 241-247.
Non-Final Office Action dated Aug. 15, 2018, issued in U.S. Appl. No. 15/522,483.

*Primary Examiner* — Caixia Lu
(74) *Attorney, Agent, or Firm* — Westerman, Hattori, Daniels & Adrian

(57) ABSTRACT

The present invention is a method for producing a conjugated diene random copolymer comprising polymerizing at least a conjugated diene monomer using a living radical polymerization method to produce a conjugated diene polymer that comprises a halogen atom at a terminal of a polymer chain, a living radical polymerization reaction being initiated using a copper salt, a multidentate ligand that comprises a nitrogen atom having an sp² hybridized orbital as a coordinating atom, and an organic halide, to produce the conjugated diene polymer having a number average molecular weight (Mn) of 1,000 to 1,000,000 and a molecular weight distribution (Mw/Mn) of less than 2.0. The present invention provides a method for efficiently and inexpensively producing a conjugated diene polymer that includes a halogen atom at the terminal of the polymer chain, and has the desired molecular weight and a narrow molecular weight distribution.

4 Claims, No Drawings

METHOD FOR PRODUCING CONJUGATED DIENE POLYMER

CROSS-REFERENCE TO RELATED APPLICATIONS

This application is a continuation of U.S. application Ser. No. 15/522,483, filed on Apr. 27, 2017, which is a 371 of International Application No. PCT/JP2015/080339, filed on Oct. 28, 2015, which is based upon and claims the benefit of priority from the prior Japanese Patent Application No. 2014-220487, filed on Oct. 29, 2014.

TECHNICAL FIELD

The present invention relates to a method for producing a conjugated diene polymer that includes a halogen atom at the terminal of the polymer chain by polymerizing at least a conjugated diene monomer using a living radical polymerization method.

BACKGROUND ART

A conjugated diene polymer (e.g., styrene-butadiene rubber and nitrile rubber) is used as a raw material for producing a rubber product (e.g., tire).

In particular, a conjugated diene polymer that includes a halogen atom at the terminal of the polymer chain is useful as an intermediate for producing a rubber product since the desired functional group or the like can be introduced into the terminal of the polymer chain so as to substitute the halogen atom.

It is possible to produce a rubber product having higher performance by stably producing a conjugated diene polymer having a specific molecular weight and a narrow molecular weight distribution.

A method that utilizes a living radical polymerization method is known as a method for producing a conjugated diene polymer that includes a halogen atom at the terminal of the polymer chain, and has a narrow molecular weight distribution.

For example, Patent Literature 1 discloses a method that produces a conjugated diene polymer by polymerizing a conjugated diene monomer and the like by means of a living radical polymerization method using a specific ruthenium complex and an organic halide.

CITATION LIST

Patent Literature

Patent Literature 1: WO2013/38957

SUMMARY OF INVENTION

Technical Problem

A conjugated diene polymer that includes a halogen atom at the terminal of the polymer chain, and has the desired molecular weight and a narrow molecular weight distribution, can be produced by utilizing the method disclosed in Patent Literature 1 (see above).

However, there is a tendency that the reaction time increases when the method disclosed in Patent Literature 1 is used. Therefore, a method that can produce the desired conjugated diene polymer within a short time has been desired. Moreover, since the method disclosed in Patent Literature 1 uses relatively expensive ruthenium as the metal component, a method that can more inexpensively produce the desired conjugated diene polymer has been desired.

The invention was conceived in view of the above situation. An object of the invention is to provide a method that can more efficiently and more inexpensively produce a conjugated diene polymer that includes a halogen atom at the terminal of the polymer chain, and has the desired molecular weight and a narrow molecular weight distribution.

Solution to Problem

The inventor conducted extensive studies in order to solve the above problem. As a result, the inventor found that it is possible to more efficiently and inexpensively produce a conjugated diene polymer that includes a halogen atom at the terminal of the polymer chain, and has the desired molecular weight and a narrow molecular weight distribution, by initiating a living radical polymerization reaction using a copper salt, a specific multidentate ligand, and an organic halide to polymerize a conjugated diene monomer and the like. This finding has led to the completion of the invention.

One aspect of the invention provides the following method for producing a conjugated diene polymer (see (1) to (3)).

(1) A method for producing a conjugated diene polymer including polymerizing at least a conjugated diene monomer using a living radical polymerization method to produce a conjugated diene polymer that includes a halogen atom at the terminal of the polymer chain, a living radical polymerization reaction being initiated using a copper salt, a multidentate ligand that includes a nitrogen atom having an $sp^2$ hybridized orbital as a coordinating atom, and an organic halide, to produce the conjugated diene polymer having a number average molecular weight (Mn) of 1,000 to 1,000,000 and a molecular weight distribution (Mw/Mn) of less than 2.0.

(2) The method for producing a conjugated diene polymer according to (1), wherein the number of coordinating atoms included in the multidentate ligand is 2 to 4.

(3) The method for producing a conjugated diene polymer according to (1) or (2), wherein the multidentate ligand includes two or more nitrogen atoms having an $sp^2$ hybridized orbital as the coordinating atoms.

Advantageous Effects of Invention

One aspect of the invention can thus efficiently and inexpensively produce a conjugated diene polymer that includes a halogen atom at the terminal of the polymer chain, and has the desired molecular weight and a narrow molecular weight distribution.

DESCRIPTION OF EMBODIMENTS

A method for producing a conjugated diene polymer according to one embodiment of the invention (hereinafter may be referred to as "method according to one embodiment of the invention") includes polymerizing a conjugated diene monomer using a living radical polymerization method to produce a conjugated diene polymer that includes a halogen atom at the terminal of the polymer chain, a living radical polymerization reaction being initiated using a copper salt, a multidentate ligand that includes a nitrogen atom having an $sp^2$ hybridized orbital as a coordinating atom, and an organic halide, to produce the conjugated diene polymer having a number average molecular weight (Mn) of 1,000 to 1,000,000 and a molecular weight distribution (Mw/Mn) of less than 2.0.

Monomer

The method according to one embodiment of the invention uses at least a conjugated diene monomer as the monomer.

Examples of the conjugated diene monomer include 1,3-butadiene, isoprene (2-methyl-1,3-butadiene), 2-ethyl-1,3-butadiene, 2,3-dimethyl-1,3-butadiene, chloroprene (2-chlorol-1,3-butadiene), 1,3-pentadiene, 2-methyl-1,3-pentadiene, 4-methyl-1,3-pentadiene, 1,3-hexadiene, 3,4-dimethyl-1,3-hexadiene, 2,4-hexadiene, 4,5-dimethyl-1,3-octadiene, 3-butyl-1,3-octadiene, and the like.

These conjugated diene monomers may be used either alone or in combination.

It is preferable to use 1,3-butadiene, isoprene or 1,3-pentadiene since a conjugated diene polymer that is more suitable as a raw material for producing a rubber product can be easily obtained.

The method according to one embodiment of the invention may use an α,β-ethylenically unsaturated monomer that is copolymerizable with the conjugated diene monomer, as the monomer in addition to the conjugated diene monomer. Examples of such a monomer include an α,β-ethylenically unsaturated nitrile monomer such as acrylonitrile, methacrylonitrile, fumaronitrile, and α-chloroacrylonitrile; an aromatic vinyl monomer such as styrene, o-methylstyrene, m-methylstyrene, p-methylstyrene, 2,4-dimethylstyrene, o-ethylstyrene, m-ethylstyrene, p-ethylstyrene, p-t-butylstyrene, α-methylstyrene, α-methyl-p-methylstyrene, o-chlorostyrene, m-chlorostyrene, p-chlorostyrene, p-bromostyrene, 2-methyl-4,6-dichlorostyrene, 2,4-dibromostyrene, vinylnaphthalene, 4-(chloromethyl)styrene, 4-methoxystyrene, 4-hydroxystyrene, divinylbenzene, 4-styrenesulfonic acid, and alkali metal salts (e.g., sodium salt and potassium salt) thereof; a (meth)acrylate monomer such as methyl (meth)acrylate, butyl (meth)acrylate, 2-ethylhexyl (meth) acrylate, 2-methoxyethyl (meth)acrylate, 2-hydroxyethyl (meth)acrylate, and glycidyl (meth)acrylate; an α,β-ethylenically unsaturated carboxylic acid monomer such as (meth)acrylic acid, itaconic acid, maleic acid, and fumaric acid; a maleimide-based monomer such as maleimide, methylmaleimide, and phenylmaleimide; an acrylamide-based monomer such as acrylamide, N,N-dimethylacrylamide, and N,N-diisopropylacrylamide; a vinyl-based monomer such as 2-vinylthiophene, 2-vinylfuran, N-methyl-2-vinylpyrrole, 1-vinyl-2-pyrrolidone, 2-vinylpyridine, 4-vinylpyridine, vinyl acetate, vinyl chloride, and vinylidene chloride; and the like. Note that the term "(meth)acrylic acid" used herein refers to "acrylic acid" or "methacrylic acid".

These α,β-ethylenically unsaturated monomers may be used either alone or in combination.

It is preferable to use an α,β-ethylenically unsaturated nitrile monomer, an aromatic vinyl monomer, or a (meth) acrylate monomer, since a conjugated diene polymer that is more suitable as a raw material for producing a rubber product can be easily obtained.

When implementing the method according to one embodiment of the invention, the conjugated diene monomer is preferably used in a ratio of 10 wt % or more, more preferably 20 to 90 wt %, still more preferably 30 to 80 wt %, and particularly preferably 50 to 80 wt %, based on the total amount of monomer.

When the conjugated diene monomer is used in a ratio of 10 wt % or more, it is possible to easily obtain a conjugated diene polymer that is more suitable as a raw material for producing a rubber product.

Living Radical Polymerization Reaction

When implementing the method according to one embodiment of the invention, the living radical polymerization reaction is initiated using a copper salt, a multidentate ligand that includes a nitrogen atom having an $sp^2$ hybridized orbital as a coordinating atom, and an organic halide.

The copper salt that is used in connection with the method according to one embodiment of the invention is used as a copper source to form a copper complex. Specifically, the multidentate ligand that includes a nitrogen atom having an $sp^2$ hybridized orbital as a coordinating atom is coordinated to the copper ion included in the copper salt to form a copper complex. It is considered that interaction occurs between the copper complex and the organic halide to produce an organic radical, so that the living radical polymerization reaction is initiated (as described later).

A copper(I) salt is preferably used as the copper salt. The copper(I) salt is not particularly limited. A known compound that is used to prepare a copper(I) complex may be used as the copper(I) salt.

Examples of the copper(I) salt include copper(I) chloride, copper(I) bromide, copper(I) iodide, copper(I) oxide, copper (I) perchlorate, and the like.

When implementing the method according to one embodiment of the invention, the copper salt may be used in an arbitrary amount. The copper salt is used in an appropriate amount taking account of the molecular weight of the desired conjugated diene polymer, but is normally used in a ratio of 0.00001 to 50 parts by weight, and preferably 0.0001 to 10 parts by weight, based on 100 parts by weight of the monomer.

The multidentate ligand that includes a nitrogen atom having an $sp^2$ hybridized orbital as a coordinating atom (hereinafter may be referred to as "ligand (α)") that is used in connection with the method according to one embodiment of the invention is used to form a copper complex.

The number of coordinating atoms included in the ligand (α) is preferably 2 to 4, more preferably 2 to 3, and particularly preferably 2.

It is preferable that the ligand (α) include two or more nitrogen atoms having an $sp^2$ hybridized orbital as the coordinating atoms. It is more preferable that the ligand (α) include 2 to 4 nitrogen atoms having an $sp^2$ hybridized orbital as the coordinating atoms. It is still more preferable that the ligand (α) include 2 to 3 nitrogen atoms having an $sp^2$ hybridized orbital as the coordinating atoms. It is particularly preferable that the ligand (α) include two nitrogen atoms having an $sp^2$ hybridized orbital as the coordinating atoms. Specific examples of the ligand (α) include a compound that includes 2 to 4 (>C=N—) bonds in the molecule.

When the ligand (α) meets the above requirements, it is possible to more easily control the molecular weight of the conjugated diene polymer, and easily obtain a conjugated diene polymer having a narrower molecular weight distribution.

Specific examples of the ligand (α) include the compounds respectively represented by the following formulas (I) to (VI), and compounds obtained by introducing a substituent into the aromatic ring(s) included in these compounds.

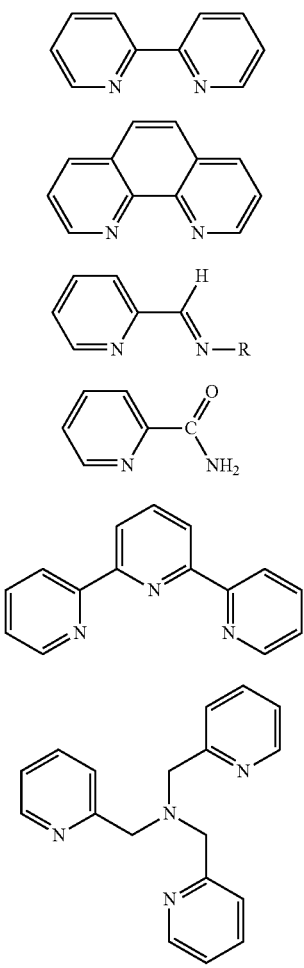

R in the formula (III) represents an alkyl group having 1 to 10 (preferably 1 to 5) carbon atoms, or an aryl group having 6 to 14 (preferably 6 to 10) carbon atoms.

Examples of the alkyl group having 1 to 10 carbon atoms that may be represented by R include a methyl group, an ethyl group, an n-propyl group, an n-butyl group, an isobutyl group, an s-butyl group, a t-butyl group, and the like.

Examples of the aryl group having 6 to 14 carbon atoms that may be represented by R include a phenyl group, a 1-naphthyl group, a 2-naphthyl group, and the like.

The compounds respectively represented by the formulas (I) to (VI) may be substituted with a substituent (hereinafter may be referred to as "R'") at an arbitrary position of the aromatic ring(s). Examples of R' include an alkyl group having 1 to 10 (preferably 1 to 5) carbon atoms; an aryl group having 6 to 14 (preferably 6 to 10) carbon atoms; an alkoxy group having 1 to 10 (preferably 1 to 5) carbon atoms; a halogen atom; and the like.

Examples of the alkyl group having 1 to 10 carbon atoms and the aryl group having 6 to 14 carbon atoms that may be represented by R' include those mentioned above in connection with R.

Examples of the alkoxy group having 1 to 10 carbon atoms that may be represented by R' include a methoxy group, an ethoxy group, an n-propoxy group, an n-butoxy group, an isobutoxy group, an s-butoxy group, a t-butoxy group, and the like.

Examples of the halogen atom that may be represented by R' include a fluorine atom, a chlorine atom, a bromine atom, an iodine atom, and the like.

It is preferable that the ligand (α) be the compound represented by the formula (I) or (II), or a compound obtained by introducing R' into the aromatic ring(s) included in the compound represented by the formula (I) or (II), since it is possible to more easily control the molecular weight of the conjugated diene polymer, and easily obtain a conjugated diene polymer having a narrower molecular weight distribution.

When implementing the method according to one embodiment of the invention, the ligand (α) may be used in an arbitrary amount. The ligand (α) is normally used in an amount of 0.1 to 100 molar equivalents, and preferably 0.5 to 50 molar equivalents, based on the copper salt.

It is considered that the ligand (α) and a copper ion produce a copper complex. The copper complex may be isolated, and used for the radical polymerization reaction, or may be used for the radical polymerization reaction in the form a solution that includes the copper complex.

The organic halide that is used in connection with the method according to one embodiment of the invention is used as an organic radical source. Specifically, interaction occurs between the organic halide and the copper complex so that the halogen atom dissociates from the organic halide to produce an organic radical, and the halogen atom is coordinated to the copper complex. It is considered that the organic radical thus produced reacts with the monomer to initiate the living radical polymerization reaction.

A known organic halide that is used for a living radical polymerization reaction may be used as the organic halide. It is preferable to use an organic bromide or an organic chloride from the viewpoint of reactivity and the like.

Examples of the organic bromide include a brominated aromatic compound such as phenylmethyl bromide, 1-phenylethyl bromide, and 1-phenylisopropyl bromide; a bromine-substituted carboxylic acid ester such as methyl 2-bromopropionate, ethyl 2-bromopropionate, methyl 2-bromoisobutyrate, and ethyl 2-bromoisobutyrate; a bromine-substituted ketone such as α-bromoacetone, α-bromoacetophenone, and α-bromoisopropyl phenyl ketone; a bromine-substituted allyl compound such as allyl bromide; a bromine-substituted nitrile compound such as 2-bromopropionitrile; an arylsulfonic acid bromide such as p-toluenesulfonyl bromide and 4-methoxybenzenesulfonyl bromide; an alkanesulfonic acid bromide such as methanesulfonyl bromide; and the like.

Examples of the organic chloride include a chlorinated aromatic compound such as phenylmethyl chloride, 1-phenylethyl chloride, and 1-phenylisopropyl chloride; a chlorine-substituted carboxylic acid ester such as methyl 2-chloropropionate, ethyl 2-chloropropionate, methyl 2-chloroisobutyrate, and ethyl 2-chloroisobutyrate; a chlorine-substituted ketone such as α-chloroacetone, α-chloroacetophenone, and α-chloroisopropyl phenyl ketone; a chlorine-substituted allyl compound such as allyl chloride; a chlorine-substituted nitrile compound such as 2-chloropropionitrile; an arylsulfonic acid chloride such as p-toluenesulfonyl chloride and 4-methoxybenzenesulfonyl chloride; an alkanesulfonic acid chloride such as methanesulfonyl bromide; and the like.

A compound that includes two or more halogen atoms (polyfunctional organic halide) may also be used. Examples of the polyfunctional organic halide include diethyl 2,5-dibromoadipate, diethyl 2,5-dichloroadipate, 1,1-dibromoacetone, 1,1-dichloroacetone, 2,2-dibromoacetophenone, 2,2-dichloroacetophenone, 1,4-dibromo-2-butene, 1,4-dichloro-2-butene, α,α'-dibromo-p-xylene, α,α'-dichloro-p-xylene, benzal bromide, benzal chloride, dibromoacetonitrile, dichloroacetonitrile, tribromoacetonitrile, trichloroacetonitrile, benzotribromide, benzotrichloride, pentaerythritol tetrakis(2-bromoisobutyrate), α,α,α,α', α',α'-hexabromo-p-xylene, α,α,α,α',α',α'-hexachloro-p-xylene, and the like.

When implementing the method according to one embodiment of the invention, the organic halide may be used in an arbitrary amount. The organic halide is normally used in an amount of 0.001 to 10 parts by weight, and preferably 0.005 to 10 parts by weight, based on 100 parts by weight of the monomer.

When implementing the method according to one embodiment of the invention, the copper salt, the ligand (α), and the organic halide may be used in an arbitrary way (e.g., order) as long as interaction occurs between the copper complex and the organic halide so that the living radical polymerization reaction is initiated.

For example, the living radical polymerization reaction may be initiated by mixing a reaction mixture that includes a copper complex obtained by reacting a copper salt with the ligand (α), or the copper complex isolated from the reaction mixture, with the organic halide, the monomer, and the like, and heating the mixture to a specific temperature (Method 1).

Alternatively, the living radical polymerization reaction may be initiated by mixing the copper salt, the ligand (α), the organic halide, the monomer, and the like to produce a copper complex in the reaction system, and heating the mixture to a specific temperature (Method 2).

The living radical polymerization according to one embodiment of the invention may be effected in the presence or absence of a solvent.

Examples of the solvent include an aromatic hydrocarbon-based solvent such as benzene, toluene, and xylene; an aliphatic hydrocarbon-based solvent such as n-butane, n-pentane, and n-hexane; an alicyclic hydrocarbon-based solvent such as cyclopentane, cyclohexane, and cyclohexene; an ether-based solvent such as diethyl ether and tetrahydrofuran; a halogenated hydrocarbon-based solvent such as chloroform and chlorobenzene; a ketone-based solvent such as acetone and methyl ethyl ketone; an alcohol-based solvent such as methanol and ethanol; a nitrile-based solvent such as acetonitrile and propionitrile; a linear ester-based solvent such as ethyl acetate and butyl acetate; a cyclic ester-based solvent such as γ-butyrolactone; an amide-based solvent such as N,N-dimethylformamide; and the like.

These solvents may be used to prepare the copper complex when Method 1 is used.

The method according to one embodiment of the invention may be effected in the presence of a reducing agent. The conversion rate of the monomer (i.e., the ratio of the monomer used for the polymerization reaction (hereinafter the same)) can be improved by effecting the living radical polymerization reaction in the presence of a reducing agent, so that a conjugated diene polymer having a higher molecular weight can be easily obtained.

Examples of the reducing agent include metallic copper; an organic acid such as citric acid, oxalic acid, and ascorbic acid; an aldehyde such as formaldehyde, acetaldehyde, and benzaldehyde; phenol and a derivative thereof, such as phenol and hydroquinone; phosphine and a derivative thereof, such as trimethyl phosphine, triethyl phosphine, and triphenyl phosphine; and the like.

The reducing agent is normally used in an amount of 0.01 to 100 molar equivalents, and preferably 0.1 to 50 molar equivalents, based on the copper salt.

The method according to one embodiment of the invention may be effected in the presence of a radical generator. The conversion rate of the monomer can be improved by effecting the living radical polymerization reaction in the presence of a radical generator, so that a conjugated diene polymer having a higher molecular weight can be easily obtained.

Examples of the radical generator include an azo-based radical generator such as 2,2'-azobisisobutyronitrile, 2,2'-azobispropane, 2,2'-dichloro-2,2'-azobispropane, 1,1'-azo(methylethyl) diacetate, 1,1'-azobis-1-chlorophenylethane, 1,1'-azobis-1-cyclohexanecarbonitrile, and 1,1'-azobis-1-phenylethane; a peroxide-based radical generator such as acetyl peroxide, cumyl peroxide, tert-butyl peroxide, benzoyl peroxide, 2-chlorobenzoyl peroxide, and tert-butyl hydroperoxide; and the like.

The radical generator is normally used in an amount of 0.01 to 10 molar equivalents, and preferably 0.1 to 5 molar equivalents, based on the organic halide.

It is preferable to effect the living radical polymerization reaction in an inert gas atmosphere (e.g., nitrogen gas atmosphere or argon gas atmosphere). It is possible to more easily obtain a conjugated diene polymer having the desired molecular weight and a narrow molecular weight distribution by effecting the living radical polymerization reaction in an inert gas atmosphere.

The reaction temperature is not particularly limited, but is normally 10 to 150° C., and preferably 20 to 140° C.

The reaction time is not particularly limited, but is normally 30 minutes to 48 hours, and preferably 1 to 24 hours.

After completion of the reaction, a known purification method is optionally performed to obtain the desired conjugated diene polymer.

For example, when the living radical polymerization reaction has been effected in the absence of a solvent, a volatile component is evaporated under reduced pressure to obtain the desired conjugated diene polymer. When the living radical polymerization reaction has been effected in the presence of a solvent, the desired conjugated diene polymer can be obtained from a residue obtained by evaporating the solvent and the like from the reaction mixture. Note that the desired conjugated diene polymer can also be obtained by adding a poor solvent to the reaction mixture to precipitate a polymer. The resulting conjugated diene polymer may optionally be dried.

Conjugated Diene Polymer

A conjugated diene polymer that is produced using the method according to one embodiment of the invention includes a halogen atom at the terminal of the polymer chain. The halogen atom situated at the terminal of the polymer chain is derived from the organic halide.

Specifically, the method according to one embodiment of the invention can produce a conjugated diene polymer that includes a halogen atom at the terminal of the polymer chain, in the same manner as a known atom transfer radical polymerization (ATRP) method.

Whether or not a halogen atom is present at the terminal of the polymer chain can be determined by $^1$H-NMR analysis.

The number average molecular weight (Mn) of the conjugated diene polymer produced using the method according to one embodiment of the invention is 1,000 to 1,000,000, and preferably 1,000 to 500,000. The molecular weight distribution (Mw/Mn) of the conjugated diene polymer produced using the method according to one embodiment of the invention is less than 2.0, and preferably 1.2 to 2.0.

A conjugated diene polymer having a number average molecular weight (Mn) and a molecular weight distribution (Mw/Mn) within the above ranges is more suitable as a raw material for producing a rubber product, for example.

Note that the number average molecular weight (Mn) and the molecular weight distribution (Mw/Mn) refer to standard polystyrene-equivalent values determined by gel permeation chromatography using tetrahydrofuran as an eluent.

The number average molecular weight (Mn) and the molecular weight distribution (Mw/Mn) of the conjugated diene polymer can be controlled by adjusting the amount of monomer, selecting an appropriate ligand ($\alpha$), and optimizing the reaction conditions, for example.

For example, it is possible to easily obtain a conjugated diene polymer having a high molecular weight and a narrow molecular weight distribution by utilizing a ligand ($\alpha$) that includes 2 to 4 coordinating atoms, or a ligand ($\alpha$) that includes two or more nitrogen atoms having an $sp^2$ hybridized orbital as the coordinating atoms.

The molecular weight of the conjugated diene polymer can be increased while maintaining a narrow molecular weight distribution by effecting the living radical polymerization reaction in the presence of a reducing agent or a radical generator, or increasing the reaction time.

A conjugated diene polymer that is produced using the method according to one embodiment of the invention includes a halogen atom at the terminal of the polymer chain (see above). A block copolymer can be produced by effecting a further polymerization reaction by utilizing the halogen atom.

For example, a conjugated diene polymer produced using the method according to one embodiment of the invention is dissolved in a solvent, the monomer (I), the copper salt, the multidentate ligand, and the like are added thereto, and a polymerization reaction is effected to obtain a block copolymer that includes a block that includes the conjugated diene polymer, and a block that includes the monomer (I).

The desired substituent can be introduced into the terminal of the polymer chain of a conjugated diene polymer produced using the method according to one embodiment of the invention by effecting a nucleophilic substitution reaction or the like by utilizing the halogen atom (i.e., an atom that is to be removed) situated at the terminal of the polymer chain.

As described above, a conjugated diene polymer produced using the method according to one embodiment of the invention can suitably be used as an intermediate for producing a polymer having a different function.

Since a conjugated diene polymer produced using the method according to one embodiment of the invention has the desired molecular weight and a narrow molecular weight distribution, the conjugated diene polymer can also suitably be used as raw material for producing a rubber product, for example.

EXAMPLES

The invention is further described below by way of examples and comparative examples. Note that the invention is not limited to the following examples. The unit "parts" used in connection with the examples refers to "parts by weight".

The conjugated diene copolymers obtained in the examples and the comparative examples were analyzed as described below.

(1) Conversion Rate of Monomer

The conversion rate of each monomer was determined by gas chromatography.

More specifically, the conversion rate of each monomer was calculated from the ratio of the residual monomer with respect to mesitylene (internal standard) based on an internal standard method.

(2) Measurement of Molecular Weight

The weight average molecular weight (Mw) and the number average molecular weight (Mn) of the conjugated diene polymer were determined by gel permeation chromatography as polystyrene-equivalent values.

The gel permeation chromatography conditions are listed below.

Chromatograph: high-performance liquid chromatograph ("HLC-8220" manufactured by Tosoh Corporation)

Column: polystyrene-based columns "TSKgel HHR G6000", "TSKgel HHR G5000", "TSKgel HHR G4000", and "TSKgel HHR G2500" (manufactured by Tosoh Corporation) (that were connected in series)

Detector: differential refractometer

Eluent: tetrahydrofuran

Column temperature: 40° C.

(3) Analysis of Terminal of Polymer Chain

Whether or not a bromine atom was present at the terminal of the polymer chain was determined by detecting a proton on a carbon atom situated adjacent to a bromine atom situated at the terminal of the polymer chain by means of $^1$H-NMR analysis.

In the examples and the comparative examples, the following monomers, multidentate ligands, organic halide, reducing agents, and radical generator were used.

(1) Monomer
A: isoprene
B: 1,3-butadiene
C: acrylonitrile
D: methyl methacrylate
E: styrene
F: butyl acrylate (2) Multidentate Ligand
A: 1,10-phenanthroline
B: 2,2'-bipyridyl
C: 4,4'-dimethyl-2,2'-bipyridyl
D: tris(2-pyridylmethyl)amine
E: N-butyl(2-pyridyl)methanamine
F: 2-picolinamide
G: N,N,N',N'',N''-pentamethyldiethylenetriamine (3) Organic Halide
A: methyl 2-bromoisobutyrate
B: diethyl 2,5-dibromoadipate
C: pentaerythritol tetrakis(2-bromoisobutyrate)

(4) Reducing Agent
A: copper powder
B: ascorbic acid (5) Radical Generator
A: 1,1'-azobis(cyclohexane-1-carbonitrile)

Example 1

In a glovebox in which the internal atmosphere had been replaced by nitrogen, a 30 mL glass reaction vessel was charged with 0.43 parts of copper(I) bromide (manufactured by Wako Pure Chemical Industries, Ltd. (hereinafter the same)) (copper salt), 1.62 parts of 1,10-phenanthroline (manufactured by Tokyo Chemical Industry Co., Ltd. (hereinafter the same)) (multidentate ligand), 79.6 parts of acrylonitrile (manufactured by Wako Pure Chemical Industries, Ltd. (hereinafter the same)) (monomer), 102.2 parts of isoprene (manufactured by Tokyo Chemical Industry Co., Ltd. (hereinafter the same)) (monomer), 5.4 parts of methyl 2-bromoisobutyrate (manufactured by Wako Pure Chemical Industries, Ltd. (hereinafter the same)) (organic halide), and 23.5 parts of mesitylene (manufactured by Wako Pure Chemical Industries, Ltd. (hereinafter the same)) (gas chromatography internal standard), and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 66%, the conversion rate of acrylonitrile was 56%, and the isoprene-acrylonitrile random copolymer had a weight average molecular weight (Mw) of 3,870, a number average molecular weight (Mn) of 2,700, and a molecular weight distribution (Mw/Mn) of 1.44. It was confirmed that a bromine atom was present at the terminal of the polymer chain.

Example 2

A polymerization reaction was effected in the same manner as in Example 1, except that 0.57 parts of a copper powder (manufactured by Wako Pure Chemical Industries, Ltd. (hereinafter the same)) (reducing agent) was further added, and the amount of 1,10-phenanthroline was changed to 6.48 parts, to obtain an isoprene-acrylonitrile random copolymer.

The resulting isoprene-acrylonitrile random copolymer was analyzed, and it was found that the conversion rate of isoprene was 85%, and the conversion rate of acrylonitrile was 75%. The isoprene-acrylonitrile random copolymer had a weight average molecular weight (Mw) of 10,690, a number average molecular weight (Mn) of 7,150, and a molecular weight distribution (Mw/Mn) of 1.50. It was confirmed that a bromine atom was present at the terminal of the polymer chain.

Example 3

In a glovebox in which the internal atmosphere had been replaced by nitrogen, a 30 mL glass reaction vessel was charged with 1.72 parts of copper(I) bromide, 6.48 parts of 1,10-phenanthroline, 238.8 parts of acrylonitrile, 306.5 parts of isoprene, 0.27 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 36%, the conversion rate of acrylonitrile was 32%, and the isoprene-acrylonitrile random copolymer had a weight average molecular weight (Mw) of 17,640, a number average molecular weight (Mn) of 14,040, and a molecular weight distribution (Mw/Mn) of 1.26. It was confirmed that a bromine atom was present at the terminal of the polymer chain.

Example 4

In a glovebox in which the internal atmosphere had been replaced by nitrogen, a 30 mL glass reaction vessel was charged with 0.43 parts of copper(I) bromide, 6.48 parts of 1,10-phenanthroline, 0.57 parts of a copper powder, 238.8 parts of acrylonitrile, 306.5 parts of isoprene, 0.27 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 62%, the conversion rate of acrylonitrile was 55%, and the isoprene-acrylonitrile random copolymer had a weight average molecular weight (Mw) of 211,800, a number average molecular weight (Mn) of 135,000, and a molecular weight distribution (Mw/Mn) of 1.57. It was confirmed that a bromine atom was present at the terminal of the polymer chain.

Example 5

A polymerization reaction was effected in the same manner as in Example 4, except that 0.54 parts of diethyl 2,5-dibromoadipate (manufactured by Tokyo Chemical Industry Co., Ltd.) was used instead of methyl 2-bromoisobutyrate, to obtain an isoprene-acrylonitrile random copolymer.

The resulting isoprene-acrylonitrile random copolymer was analyzed, and it was found that the conversion rate of isoprene was 65%, the conversion rate of acrylonitrile was 60%, and the isoprene-acrylonitrile random copolymer had a weight average molecular weight (Mw) of 80,000, a number average molecular weight (Mn) of 51,800, and a molecular weight distribution (Mw/Mn) of 1.55. It was confirmed that a bromine atom was present at the terminal of the polymer chain.

Example 6

A polymerization reaction was effected in the same manner as in Example 4, except that 1.1 parts of pentaerythritol tetrakis(2-bromoisobutyrate) (manufactured by Sigma-Aldrich) was used instead of methyl 2-bromoisobutyrate, to obtain an isoprene-acrylonitrile random copolymer.

The resulting isoprene-acrylonitrile random copolymer was analyzed, and it was found that the conversion rate of isoprene was 69%, the conversion rate of acrylonitrile was 59%, and the isoprene-acrylonitrile random copolymer had a weight average molecular weight (Mw) of 134,300, a number average molecular weight (Mn) of 83,700, and a molecular weight distribution (Mw/Mn) of 1.61. It was confirmed that a bromine atom was present at the terminal of the polymer chain.

Example 7

In a glovebox in which the internal atmosphere had been replaced by nitrogen, a 30 mL glass reaction vessel was charged with 0.14 parts of copper(I) bromide, 5.4 parts of 1,10-phenanthroline, 1.76 parts of ascorbic acid (manufactured by Tokyo Chemical Industry Co., Ltd.) (reducing agent), 238.8 parts of acrylonitrile, 306.5 parts of isoprene, 0.27 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 57%, the conversion rate of acrylonitrile was 55%, and the isoprene-acrylonitrile random copolymer had a weight average molecular weight (Mw) of 128,800, a number average molecular weight (Mn) of 76,200, and a molecular weight distribution (Mw/Mn) of 1.69. It was confirmed that a bromine atom was present at the terminal of the polymer chain.

Example 8

In a glovebox in which the internal atmosphere had been replaced by nitrogen, a 30 mL glass reaction vessel was charged with 4.3 parts of copper(I) bromide, 16.2 parts of 1,10-phenanthroline, 1.46 parts of 1,1'-azobis(cyclohexane-1-carbonitrile) (manufactured by Wako Pure Chemical Industries, Ltd.) (radical generator), 79.6 parts of acrylonitrile, 102.2 parts of isoprene, 5.4 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 82%, the conversion rate of acrylonitrile was 69%, and the isoprene-acrylonitrile random copolymer had a weight average molecular weight (Mw) of 10,300, a number average molecular weight (Mn) of 6,250, and a molecular weight distribution (Mw/Mn) of 1.64. It was confirmed that a bromine atom was present at the terminal of the polymer chain.

Example 9

A polymerization reaction was effected in the same manner as in Example 8, except that 14.1 parts of 2,2'-bipyridyl (manufactured by Tokyo Chemical Industry Co., Ltd. (hereinafter the same)) was used instead of 1,10-phenanthroline, to obtain an isoprene-acrylonitrile random copolymer.

The resulting isoprene-acrylonitrile random copolymer was analyzed, and it was found that the conversion rate of isoprene was 74%, the conversion rate of acrylonitrile was 67%, and the isoprene-acrylonitrile random copolymer had a weight average molecular weight (Mw) of 6,230, a number average molecular weight (Mn) of 3,710, and a molecular weight distribution (Mw/Mn) of 1.68. It was confirmed that a bromine atom was present at the terminal of the polymer chain.

Example 10

A polymerization reaction was effected in the same manner as in Example 8, except that 16.6 parts of 4,4'-dimethyl-2,2'-bipyridyl (manufactured by Tokyo Chemical Industry Co., Ltd.) was used instead of 1,10-phenanthroline, to obtain an isoprene-acrylonitrile random copolymer.

The resulting isoprene-acrylonitrile random copolymer was analyzed, and it was found that the conversion rate of isoprene was 80%, the conversion rate of acrylonitrile was 73%, and the isoprene-acrylonitrile random copolymer had a weight average molecular weight (Mw) of 7,900, a number average molecular weight (Mn) of 4,670, and a molecular weight distribution (Mw/Mn) of 1.69. It was confirmed that a bromine atom was present at the terminal of the polymer chain.

Example 11

A polymerization reaction was effected in the same manner as in Example 8, except that 26.1 parts of tris(2-pyridylmethyl)amine was used instead of 1,10-phenanthroline, to obtain an isoprene-acrylonitrile random copolymer.

The resulting isoprene-acrylonitrile random copolymer was analyzed, and it was found that the conversion rate of isoprene was 80%, the conversion rate of acrylonitrile was 75%, and the isoprene-acrylonitrile random copolymer had a weight average molecular weight (Mw) of 11,500, a number average molecular weight (Mn) of 6,360, and a molecular weight distribution (Mw/Mn) of 1.81. It was confirmed that a bromine atom was present at the terminal of the polymer chain.

Example 12

A polymerization reaction was effected in the same manner as in Example 8, except that 14.6 parts of N-butyl(2-pyridyl)methanimine (manufactured by Sigma-Aldrich) was used instead of 1,10-phenanthroline, to obtain an isoprene-acrylonitrile random copolymer.

The resulting isoprene-acrylonitrile random copolymer was analyzed, and it was found that the conversion rate of isoprene was 65%, the conversion rate of acrylonitrile was 58%, and the isoprene-acrylonitrile random copolymer had a weight average molecular weight (Mw) of 8,500, a number average molecular weight (Mn) of 4,630, and a molecular weight distribution (Mw/Mn) of 1.84. It was confirmed that a bromine atom was present at the terminal of the polymer chain.

Example 13

A polymerization reaction was effected in the same manner as in Example 8, except that 11.0 parts of 2-picolinamide (manufactured by Tokyo Chemical Industry Co., Ltd.) was used instead of 1,10-phenanthroline, to obtain an isoprene-acrylonitrile random copolymer.

The resulting isoprene-acrylonitrile random copolymer was analyzed, and it was found that the conversion rate of isoprene was 76%, the conversion rate of acrylonitrile was 70%, and the isoprene-acrylonitrile random copolymer had a weight average molecular weight (Mw) of 14,700, a number average molecular weight (Mn) of 7,800, and a molecular weight distribution (Mw/Mn) of 1.88. It was confirmed that a bromine atom was present at the terminal of the polymer chain.

Example 14

A 1 L autoclave in which the internal atmosphere had been replaced by nitrogen, was charged with 0.59 parts of copper(I) bromide, 11.5 parts of 2,2'-bipyridyl, 1.30 parts of a copper powder, 94.9 parts of acrylonitrile, 124.7 parts of 1,3-butadiene (manufactured by Tokyo Chemical Industry Co., Ltd.), 5.4 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain a butadiene-acrylonitrile random copolymer.

The resulting butadiene-acrylonitrile random copolymer was analyzed, and it was found that the conversion rate of 1,3-butadiene was 87%, the conversion rate of acrylonitrile was 76%, and the butadiene-acrylonitrile random copolymer had a weight average molecular weight (Mw) of 4,690, a number average molecular weight (Mn) of 3,350, and a molecular weight distribution (Mw/Mn) of 1.39. It was confirmed that a bromine atom was present at the terminal of the polymer chain.

Example 15

A polymerization reaction was effected in the same manner as in Example 9, except that 150.2 parts of methyl methacrylate (manufactured by Tokyo Chemical Industry Co., Ltd.) was used instead of acrylonitrile, to obtain an isoprene-methyl methacrylate random copolymer.

The resulting isoprene-methyl methacrylate random copolymer was analyzed, and it was found that the conversion rate of isoprene was 65%, the conversion rate of methyl methacrylate was 54%, and the isoprene-methyl methacrylate random copolymer had a weight average molecular weight (Mw) of 14,600, a number average molecular weight (Mn) of 8,310, and a molecular weight distribution (Mw/Mn) of 1.76. It was confirmed that a bromine atom was present at the terminal of the polymer chain.

Example 16

A polymerization reaction was effected in the same manner as in Example 9, except that 156.0 parts of styrene (manufactured by Tokyo Chemical Industry Co., Ltd.) was used instead of acrylonitrile, to obtain an isoprene-styrene random copolymer.

The resulting isoprene-styrene random copolymer was analyzed, and it was found that the conversion rate of isoprene was 52%, the conversion rate of styrene was 27%, and the isoprene-styrene random copolymer had a weight average molecular weight (Mw) of 9,730, a number average molecular weight (Mn) of 5,690, and a molecular weight distribution (Mw/Mn) of 1.71. It was confirmed that a bromine atom was present at the terminal of the polymer chain.

Example 17

A polymerization reaction was effected in the same manner as in Example 9, except that 192.0 parts of butyl acrylate (manufactured by Wako Pure Chemical Industries, Ltd.) was used instead of acrylonitrile, to obtain an isoprene-butyl acrylate random copolymer.

The resulting isoprene-butyl acrylate random copolymer was analyzed, and it was found that the conversion rate of isoprene was 72%, the conversion rate of butyl acrylate was 56%, and the isoprene-butyl acrylate random copolymer had a weight average molecular weight (Mw) of 10,710, a number average molecular weight (Mn) of 6,480, and a molecular weight distribution (Mw/Mn) of 1.65. It was confirmed that a bromine atom was present at the terminal of the polymer chain.

Example 18

In a glovebox in which the internal atmosphere had been replaced by nitrogen, a 30 mL glass reaction vessel was charged with 0.43 parts of copper(I) bromide, 6.48 parts of 1,10-phenanthroline, 0.57 parts of a copper powder, 238.8 parts of acrylonitrile, 306.5 parts of isoprene, 1.62 parts of methyl 2-bromoisobutyrate, and 23.5 parts of mesitylene, and the mixture was stirred at 80° C. for 18 hours to effect a polymerization reaction.

After evaporating a volatile component from the reaction product under reduced pressure, the residue was dried to obtain an isoprene-acrylonitrile random copolymer.

The resulting isoprene-acrylonitrile random copolymer was analyzed, and it was found that the conversion rate of isoprene was 59%, the conversion rate of acrylonitrile was 54%, and the isoprene-acrylonitrile random copolymer had a weight average molecular weight (Mw) of 59,830, a number average molecular weight (Mn) of 32,020, and a molecular weight distribution (Mw/Mn) of 1.87. It was confirmed that a bromine atom was present at the terminal of the polymer chain.

In a glovebox in which the internal atmosphere had been replaced by nitrogen, a 30 mL glass reaction vessel was charged with the isoprene-acrylonitrile random copolymer (i.e., the total amount of isoprene-acrylonitrile random copolymer excluding the isoprene-acrylonitrile random copolymer that has been analyzed), 2.15 parts of copper(I) bromide, 150.0 parts of toluene, 150.2 parts of methyl methacrylate, and 23.5 parts of mesitylene, and the mixture was stirred at 100° C. for 24 hours to effect a polymerization reaction.

After evaporating a volatile component from the reaction solution under reduced pressure, the residue was dried to obtain an (isoprene-acrylonitrile)/methyl methacrylate block copolymer.

The resulting (isoprene-acrylonitrile)/methyl methacrylate block copolymer was analyzed, and it was found that the conversion rate of methyl methacrylate was 43%, and the (isoprene-acrylonitrile)/methyl methacrylate block copolymer had a weight average molecular weight (Mw) of 98,420, a number average molecular weight (Mn) of 49,460, and a molecular weight distribution (Mw/Mn) of 1.99.

Comparative Example 1

A polymerization reaction was effected in the same manner as in Example 1, except that 5.81 parts of N,N,N',N",N"-pentamethyldiethylenetriamine (manufactured by Tokyo Chemical Industry Co., Ltd.) was used instead of 1,10-phenanthroline.

The reaction product was analyzed, and it was found that the conversion rate of isoprene was 25%, the conversion rate of acrylonitrile was 24%, and the reaction product had a weight average molecular weight (Mw) of 440, a number average molecular weight (Mn) of 400, and a molecular weight distribution (Mw/Mn) of 1.10. The reaction product was an oligomer.

Reference Example 1

In a glovebox in which the internal atmosphere had been replaced by nitrogen, a 30 mL glass reaction vessel was charged with 1.17 parts of a chloropentamethylcyclopentadienyl triphenylphosphine $\eta^2$-acrylonitrile ruthenium (synthesized using the method disclosed in WO2013/038957), 263 parts of toluene (solvent), 2.58 parts of dibutylamine (activator), 53.0 parts of acrylonitrile (monomer), 68.2 parts of isoprene (monomer), 3.7 parts of methyl α-chlorophenylacetate (manufactured by Sigma-Aldrich) (organic halide), and 23.5 parts of mesitylene, and the mixture was stirred at 80° C. for 142 hours to effect a polymerization reaction.

After evaporating a volatile component from the reaction solution under reduced pressure, the residue was dried to obtain an isoprene-acrylonitrile random copolymer.

The resulting isoprene-acrylonitrile random copolymer was analyzed, and it was found that the conversion rate of isoprene was 88%, the conversion rate of acrylonitrile was 82%, and the isoprene-acrylonitrile random copolymer had a weight average molecular weight (Mw) of 2,660, a number average molecular weight (Mn) of 1,640, and a molecular weight distribution (Mw/Mn) of 1.62. Note that a sufficient amount of polymer had not been produced when 18 hours elapsed from the start of the reaction (i.e., when a time corresponding to the polymerization time employed in the examples elapsed).

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Monomer (parts) | 1A | 102.2 | 102.2 | 306.5 | 306.5 | 306.5 | 306.5 | 306.5 | 102.2 | 102.2 | 102.2 |
| | 1B | — | — | — | — | — | — | — | — | — | — |
| | 1C | 79.6 | 79.6 | 238.8 | 238.8 | 238.8 | 238.8 | 238.8 | 79.6 | 79.6 | 79.6 |
| | 1D | — | — | — | — | — | — | — | — | — | — |
| | 1E | — | — | — | — | — | — | — | — | — | — |
| | 1F | — | — | — | — | — | — | — | — | — | — |
| Copper bromide (parts) | | 0.43 | 0.43 | 1.72 | 0.43 | 0.43 | 0.43 | 0.14 | 4.3 | 4.3 | 4.3 |
| Multidentate ligand (parts) | 2A | 1.62 | 6.48 | 6.48 | 6.48 | 6.48 | 6.48 | 5.4 | 16.2 | — | — |
| | 2B | — | — | — | — | — | — | — | — | 14.1 | — |
| | 2C | — | — | — | — | — | — | — | — | — | 16.6 |
| | 2D | — | — | — | — | — | — | — | — | — | — |
| | 2E | — | — | — | — | — | — | — | — | — | — |
| | 2F | — | — | — | — | — | — | — | — | — | — |
| | 2G | — | — | — | — | — | — | — | — | — | — |
| Organic halide (parts) | 3A | 5.4 | 5.4 | 0.27 | 0.27 | — | — | 0.27 | 5.4 | 5.4 | 5.4 |
| | 3B | — | — | — | — | 0.54 | — | — | — | — | — |
| | 3C | — | — | — | — | — | 1.10 | — | — | — | — |
| Reducing agent (parts) | 4A | — | 0.57 | — | 0.57 | 0.57 | 0.57 | — | — | — | — |
| | 4B | — | — | — | — | — | — | 1.76 | — | — | — |
| Radical generator (parts) | 5A | — | — | — | — | — | — | — | 1.46 | 1.46 | 1.46 |
| Reaction temperature (° C.) | | 80 | 80 | 80 | 80 | 80 | 80 | 80 | 80 | 80 | 80 |
| Reaction time (hr) | | 18 | 18 | 18 | 18 | 18 | 18 | 18 | 18 | 18 | 18 |
| Monomer conversion rate (%) | 1A | 66 | 85 | 36 | 62 | 65 | 69 | 57 | 82 | 74 | 80 |
| | 1B | — | — | — | — | — | — | — | — | — | — |
| | 1C | 56 | 75 | 32 | 55 | 60 | 59 | 55 | 69 | 67 | 73 |
| | 1D | — | — | — | — | — | — | — | — | — | — |
| | 1E | — | — | — | — | — | — | — | — | — | — |
| | 1F | — | — | — | — | — | — | — | — | — | — |
| Weight average molecuar weight (Mw) | | 3,870 | 10,690 | 17,640 | 211,800 | 80,000 | 134,300 | 128,800 | 10,300 | 6,230 | 7,900 |
| Number average molecular weight (Mn) | | 2,700 | 7,150 | 14,040 | 135,000 | 51,800 | 83,700 | 76,200 | 6,250 | 3,710 | 4,670 |
| Molecular weight distribution (Mw/Mn) | | 1.44 | 1.5 | 1.26 | 1.57 | 1.55 | 1.61 | 1.69 | 1.64 | 1.68 | 1.69 |

TABLE 2

| | | Example | | | | | | | | Comparative Example | Reference Example |
|---|---|---|---|---|---|---|---|---|---|---|---|
| | | 11 | 12 | 13 | 14 | 15 | 16 | 17 | 18 | 1 | 1 |
| Monomer (parts) | 1A | 102.2 | 102.2 | 102.2 | — | 102.2 | 102.2 | 102.2 | 306.5 | 102.2 | 68.2 |
| | 1B | — | — | — | 124.7 | — | — | — | — | — | — |
| | 1C | 79.6 | 79.6 | 79.6 | 94.9 | — | — | — | 238.8 | 79.6 | 53.0 |
| | 1D | — | — | — | — | 150.2 | — | — | — | — | — |
| | 1E | — | — | — | — | — | 156.0 | — | — | — | — |
| | 1F | — | — | — | — | — | — | 192.0 | — | — | — |
| Copper bromide (parts) | | 4.30 | 4.30 | 4.30 | 0.59 | 4.30 | 4.30 | 4.30 | 0.43 | 0.43 | — |
| Multidentate ligand (parts) | 2A | — | — | — | — | — | — | — | 6.48 | — | — |
| | 2B | — | — | — | 11.50 | 14.10 | 14.10 | 14.10 | — | — | — |
| | 2C | — | — | — | — | — | — | — | — | — | — |
| | 2D | 26.10 | — | — | — | — | — | — | — | — | — |
| | 2E | — | 14.60 | — | — | — | — | — | — | — | — |
| | 2F | — | — | 11.00 | — | — | — | — | — | — | — |
| | 2G | — | — | — | — | — | — | — | — | — | 5.81 |
| Organic halide (parts) | 3A | 5.40 | 5.40 | 5.40 | 5.40 | 5.40 | 5.40 | 5.40 | 1.62 | 5.40 | — |
| | 3B | — | — | — | — | — | — | — | — | — | — |
| | 3C | — | — | — | — | — | — | — | — | — | — |

TABLE 2-continued

|  |  | Example | | | | | | | | Comparative Example | Reference Example |
|---|---|---|---|---|---|---|---|---|---|---|---|
|  |  | 11 | 12 | 13 | 14 | 15 | 16 | 17 | 18 | 1 | 1 |
| Reducing agent (parts) | 4A | — | — | — | 1.30 | — | — | — | 0.57 | — | — |
|  | 4B | — | — | — | — | — | — | — | — | — | — |
| Radical generator (parts) | 5A | 1.46 | 1.46 | 1.46 | — | 1.46 | 1.46 | 1.46 | — | — | — |
| Reaction temperature (° C.) |  | 80 | 80 | 80 | 80 | 80 | 80 | 80 | 80 | 80 | 80 |
| Reaction time (hr) |  | 18 | 18 | 18 | 18 | 18 | 18 | 18 | 18 | 18 | 142 |
| Monomer conversion rate (%) | 1A | 80 | 65 | 76 | — | 65 | 52 | 72 | 59 | 25 | 88 |
|  | 1B | — | — | — | 87 | — | — | — | — | — | — |
|  | 1C | 75 | 58 | 70 | 76 | — | — | — | 54 | 24 | 82 |
|  | 1D | — | — | — | — | 54 | — | — | — | — | — |
|  | 1E | — | — | — | — | — | 27 | — | — | — | — |
|  | 1F | — | — | — | — | — | — | 56 | — | — | — |
| Weight average molecular weight (Mw) |  | 11,500 | 8,500 | 14,700 | 4,690 | 14,600 | 9,730 | 10,710 | 59,830 | 440 | 2,660 |
| Number average molecular weight (Mn) |  | 6,360 | 4,630 | 7,800 | 3,350 | 8,310 | 5,690 | 6,480 | 32,020 | 400 | 1,640 |
| Molecular weight distribution (Mw/Mn) |  | 1.81 | 1.84 | 1.88 | 1.39 | 1.76 | 1.71 | 1.65 | 1.87 | 1.10 | 1.62 |

The following were confirmed from the results listed in Tables 1 and 2.

In Examples 1 to 18, a conjugated diene polymer having a high molecular weight and a narrow molecular weight distribution was obtained, differing from Comparative Example 1.

In Examples 1 to 18, the desired conjugated diene polymer could be produced within a significantly short time as compared with Reference Example 1.

The invention claimed is:

1. A method for producing a conjugated diene random copolymer comprising polymerizing a conjugated diene monomer and α,β-ethylenically unsaturated monomer copolymerizable with the conjugated diene monomer using a living radical polymerization method to produce a conjugated diene random copolymer that comprises a halogen atom at a terminal of a polymer chain, a living radical polymerization reaction being initiated using a copper salt, a multidentate ligand that comprises a nitrogen atom having an $sp^2$ hybridized orbital as a coordinating atom, and an organic halide, to produce the conjugated diene random copolymer having a number average molecular weight (Mn) of 1,000 to 1,000,000 and a molecular weight distribution (Mw/Mn) of less than 2.0.

2. The method for producing a conjugated diene random copolymer according to claim 1, wherein the number of coordinating atoms included in the multidentate ligand is 2 to 4.

3. The method for producing a conjugated diene random copolymer according to claim 1, wherein the multidentate ligand comprises two or more nitrogen atoms having an $sp^2$ hybridized orbital as the coordinating atoms.

4. The method for producing a conjugated diene random copolymer according to claim 2, wherein the multidentate ligand comprises two or more nitrogen atoms having an $sp^2$ hybridized orbital as the coordinating atoms.

* * * * *